United States Patent
Crowle et al.

(10) Patent No.: US 8,982,831 B2
(45) Date of Patent: Mar. 17, 2015

(54) TRANSMISSION OF DATA IN A BROADBAND RADIO COMMUNICATION SYSTEM

(71) Applicant: Cambium Networks Limited, Ashburton, Devon (GB)

(72) Inventors: Martin Richard Crowle, Ashburton (GB); Jan Jerzy Cynk, Ashburton (GB)

(73) Assignee: Cambium Networks Limited, Devon (GB)

( * ) Notice: Subject to any disclaimer, the term of this patent is extended or adjusted under 35 U.S.C. 154(b) by 0 days.

(21) Appl. No.: 14/335,137

(22) Filed: Jul. 18, 2014

(65) Prior Publication Data
US 2014/0341137 A1 Nov. 20, 2014

Related U.S. Application Data

(63) Continuation of application No. PCT/GB2013/000026, filed on Jan. 21, 2013.

(30) Foreign Application Priority Data

Jan. 19, 2012 (GB) .................................. 1200914.8

(51) Int. Cl.
*G01S 7/28* (2006.01)
*H04W 72/12* (2009.01)

(52) U.S. Cl.
CPC .............................. *H04W 72/1231* (2013.01)
USPC ........... 370/329; 370/328; 342/134; 342/135; 342/175

(58) Field of Classification Search
CPC ......... G01S 7/021; G01S 7/023; H04W 16/14
USPC .......... 370/328, 329; 342/159, 195, 134, 135, 342/175
See application file for complete search history.

(56) References Cited

U.S. PATENT DOCUMENTS

| | | | |
|---|---|---|---|
| 2003/0107512 A1 | 6/2003 | McFarland et al. | |
| 2004/0132411 A1 | 7/2004 | Li | |

(Continued)

FOREIGN PATENT DOCUMENTS

| | | |
|---|---|---|
| EP | 1 248 477 A1 | 10/2002 |
| EP | 1 562 333 A2 | 8/2005 |

(Continued)

OTHER PUBLICATIONS

Akerberg, D. et al.; "On channel definitions and rules for continuous dynamic channel selection in coexistence etiquettes for radio systems"; IEEE, Vehicular Technology Conference, 44th, Stockholm; Jun. 8, 1994; pp. 809-813; USA.
International Search Report and Written Opinion from corresponding PCT application, PCT/GB2013/000026; Jul. 10, 2013; 11p.

*Primary Examiner* — Jamal Javaid
(74) *Attorney, Agent, or Firm* — Brinks Gilson & Lione

(57) ABSTRACT

Data packets are transmitted from a terminal of a broadband radio communication system. For each transmission cycle in a transmission period data is received at a data interface of the terminal and buffered, and transmission of radio signals comprising the received data is enabled on expiry of a repetition interval from the start of a previous transmission. The repetition intervals are controlled to reduce a proportion of the transmission period for which transmission may occur at an allowed pulse repetition interval of a radar with which the terminal may interfere. The presence of radar pulses is checked during a wait period for each cycle while the terminal is not transmitting. If radar pulses are present, the transmission of radio signals which may interfere with the radar pulses is inhibited.

20 Claims, 5 Drawing Sheets

(56) References Cited

U.S. PATENT DOCUMENTS

| | | |
|---|---|---|
| 2005/0162304 A1 | 7/2005 | Mitsugi |
| 2005/0192016 A1 | 9/2005 | Zimmermann et al. |
| 2010/0173586 A1 | 7/2010 | McHenry et al. |
| 2010/0225530 A1 | 9/2010 | Lin et al. |

FOREIGN PATENT DOCUMENTS

| | | |
|---|---|---|
| WO | WO 03/047290 A1 | 6/2003 |
| WO | WO 03/050560 A1 | 6/2003 |

TRANSMISSION OF DATA IN A BROADBAND RADIO COMMUNICATION SYSTEM

RELATED APPLICATIONS

This application is a continuation of PCT Application PCT/GB2013/000026, filed on Jan. 21, 2013 entitled "TRANSMISSION OF DATA IN A BROADBAND RADIO COMMUNICATION SYSTEM", which claims the benefit of priority to Great Britain Application No. GB 1200914.8, filed on Jan. 19, 2012 entitled "TRANSMISSION OF DATA IN A BROADBAND RADIO COMMUNICATION SYSTEM", the contents of which are incorporated herein by reference in their entireties.

TECHNICAL FIELD

The present invention relates generally to transmission of data in a wireless communications system, and more specifically, but not exclusively, to a method and apparatus for transmitting data to allow improved detection of radar pulses on a channel of a broadband radio communications system using Dynamic Frequency Selection (DFS).

BACKGROUND

Increasing demand for wireless services has led to the allocation of increasing amounts of wireless spectrum for use by wireless communications systems, such as point-to-point and point to multi-point broadband radio communications systems. In some cases, bands within the wireless spectrum that were previously allocated for another use have been allocated for use by broadband radio communications systems, as either a licensed or unlicensed band. In particular some bands, for example bands at approximately 5.4 and 5.8 GHz, were formerly allocated exclusively for use by military radar systems. Since such systems are rarely used in most circumstances and at most locations, the bands have been made available for use in addition by, for example, broadband radio communications systems, provided that equipment used in these bands is arranged to detect radar pulses, and to cease transmission on a channel on which radar pulses are detected, so that interference with the operation of the radar may be avoided. In many territories, it is required that equipment be certified to detect specified types of radar pulse transmissions, with a specified range of allowed radar pulse repetition intervals (PRIs) and other specified characteristics such as pulse duration and a threshold for received power in a radar pulse, typically expressed as a received power with respect to an isotropic antenna. If radar pulses with the specified characteristics are detected, a different channel should be selected within a specified time, or if no alternative channel is available, transmission must cease for a specified period; such a process may be may be referred to as Dynamic Frequency Selection (DFS). Typically DFS is required to be implemented in certain frequency bands depending on the territory, and may be required for equipment with a transmit power greater than a specified amount and may be required, for example, for equipment deployed outdoors.

Typically, broadband radio communications equipment for operation in a band where DFS is required must be certified to meet specified requirements regarding probability of detection of radar transmissions. In a broadband radio communication system arranged to transmit and receive in the same frequency channel, such as a system operating according to a contention-based medium access control system, it is typically not possible to detect radar pulses during transmission in the frequency channel. Furthermore, at a terminal of a broadband radio communication system operating, for example, according to a contention-based medium access control system, the timing of the transmission of data packets is typically determined at least in part by the time of arrival, at a data interface, of the data packets to be transmitted. Therefore, it may be possible for data packets to arrive at the data interface spaced apart in time by intervals such that, when transmitted, the transmission has a pulse repetition interval corresponding to an allowed pulse repetition interval of a radar system that the terminal is required to detect. Therefore, the probability of detection of radar pulses may be reduced, according to the arrangement of data packets arriving at the data interface.

It is an object of the invention to mitigate the problems with the prior art systems.

SUMMARY

In accordance with a first aspect of the present invention, there is provided a method of transmitting data packets from a terminal of a broadband radio communication system, the terminal being capable of transmitting radio signals which may interfere with the radar pulses, the radar pulses being transmitted with one or more pulse repetition intervals, the method comprising, for each of a plurality of transmission cycles in a transmission period:

receiving data at a data interface of the terminal;
buffering the received data at the terminal;
enabling transmission of radio signals comprising the received data on expiry of a respective repetition interval for the cycle, the repetition interval being an interval from the start of a previous transmission, wherein the repetition intervals are controlled to reduce a proportion of the transmission period for which transmission may occur at an allowed pulse repetition interval of the radar;
checking for the presence of radar pulses during a respective wait period for each cycle whilst the terminal is not transmitting radio signals comprising received data packets; and
if radar pulses are present, inhibiting the transmission of radio signals which may interfere with the radar pulses.

This has an advantage that data may be transmitted with a transmission burst pattern such that the probability of detecting radar pulses is improved, by arranging the wait periods to be of a suitable length and repetition rate to detect radars transmitted with an expected range of pulse repetition intervals.

In an embodiment of the invention, said inhibiting of the transmission of radio signals inhibits the transmission for a defined period to allow a confirmation of detection of radar pulses.

This has an advantage that the check for the presence of radar pulses may be used as a provisional indication of the presence of radar pulses, which may be confirmed during inhibition of transmission for the defined period in order to improve a trade off between the probability of a false alarm in the detection and the probability of detection.

In an embodiment of the invention, the method comprises:
controlling the repetition intervals to reduce a probability of transmission at an allowed pulse repetition interval of the radar.

This has an advantage that the repetition intervals may be controlled to improve a probability of detection for an expected pulse repetition interval, or an expected range of pulse repetition intervals of the radar.

In an embodiment of the invention, the controlling of the repetition intervals comprises:

defining first and second transmission patterns, the first transmission pattern being for enabling transmission of the received data periodically on expiry of each of a plurality of first repetition intervals and the second transmission pattern being for enabling transmission of the received data periodically on expiry of each of a plurality of second repetition intervals.

This has an advantage that the first and second patterns may be used alternately, so that first and second repetition intervals, also referred to as chunking intervals, are used in alternating periods, so that a probability of detecting a radar having a pulse repetition interval that corresponds to the first or second repetition intervals is increased.

In an embodiment of the invention, each of the plurality of second repetition intervals is between 10% and 40% longer than each of the plurality of first repetition intervals.

This has an advantage that it may be arranged that a probability of detecting a radar having a pulse repetition interval that corresponds to the first repetition interval is increased during activation of the second pattern, and that a probability of detecting a radar having a pulse repetition interval that corresponds to the second repetition interval is increased during activation of the first pattern.

In an embodiment of the invention, the first and second repetition intervals are selected to be within a range of allowed pulse repetition intervals of the radar pulses.

This has an advantage that the first and second repetition intervals may be kept sufficiently short to reduce latency in transmission of the data packets by avoiding setting the repetition intervals to be longer than the longest allowed pulse repetition interval of the radar pulses.

In an embodiment of the invention, the first and second transmission patterns are each activated for a respective activation period.

In an embodiment of the invention, the first and second activation periods are arranged to be activated alternately.

This has an advantage that a probability of detecting a radar having a pulse repetition interval that corresponds to the first or second repetition interval is increased.

In an embodiment of the invention, the activation periods are each in the range 20 milliseconds to 200 milliseconds.

This has been found to be a beneficial range for increasing a probability of detecting a radar having a pulse repetition interval in an allowed range typically specified for detection in radio communication systems requiring DFS.

In an embodiment of the invention, the controlling of the repetition intervals comprises setting each repetition interval to be longer than a given allowed radar pulse repetition interval.

This has an advantage of allowing detection of radar pulses with a high probability of detection at a given allowed radar pulse repetition interval at which a higher probability of detection is desired.

In an embodiment of the invention, the radar pulse repetition intervals are within a range of 100 microseconds to 10 milliseconds.

This range encompasses the range of radar pulse repetition intervals typically specified for DFS.

In an embodiment of the invention, the repetition intervals are in the range 1 millisecond to 5 milliseconds.

This has been found to be an advantageous range for increasing a probability of detection of radar pulses having pulse repetition intervals typically specified for DFS.

In an embodiment of the invention, the first repletion interval is in the range 1-1.3 ms, the second repetition interval is in the range 1.4-1.8 milliseconds, and the first and second activation periods are in the range 80-130 milliseconds.

This has been found to be a particularly advantageous combination of operating parameters for increasing a probability of detection of radar pulses having pulse repetition intervals typically specified for DFS.

In an embodiment of the invention, controlling the repetition intervals comprises applying dither to the duration of the repetition intervals.

This has an advantage that a proportion of the transmission period for which transmission may occur at an allowed pulse repetition interval of the radar is reduced.

In an embodiment of the invention, controlling the repetition intervals comprises controlling the duration of repetition intervals according to a pseudo-random process.

In an embodiment of the invention, the method comprises disabling the wait period in dependence on data loading at the data interface.

This has an advantage that latency of transmitted data may be reduced, by the disabling of the wait period, when data loading is light, so that the duty cycle of transmission from the terminal would be expected to be low. In this case, interference between transmission from the terminal and radar pulses may be expected to have a low probability.

In an embodiment of the invention, the broadband radio communication system operates according to a contention-based medium access control system, and the data received at the terminal comprises data packets.

In an embodiment of the invention, the broadband radio communication system operates according to a frame-based medium access control system.

In accordance with a second aspect of the present invention, there is provided a terminal for transmitting data packets in a broadband radio communication system, the terminal being capable of transmitting radio signals which may interfere with the radar pulses, the radar pulses being transmitted with one or more pulse repetition intervals, the terminal comprising:

a data receiver arranged to, for each of a plurality of transmission cycles, receive data at a data interface of the terminal;

a buffer arranged to, for each of the plurality of transmission cycles, buffer the received data at the terminal; and a controller arranged to:

enable transmission of radio signals comprising the received data on expiry of a respective repetition interval for the cycle, the repetition interval being an interval from the start of a previous transmission, wherein the repetition intervals are controlled to reduce a proportion of the transmission period for which transmission may occur at an allowed pulse repetition interval of the radar;

check for the presence of radar pulses during a respective wait period for each cycle whilst the terminal is not transmitting radio signals comprising received data packets; and if radar pulses are present, inhibit the transmission of radio signals which may interfere with the radar pulses.

In accordance with a third aspect of the present invention, there is provided a non-transitory computer readable medium comprising instructions to cause a processor to cause a terminal to perform a method of transmitting data packets from a terminal of a broadband radio communication system, the terminal being capable of transmitting radio signals which may interfere with the radar pulses, the radar pulses being transmitted with one or more pulse repetition intervals, the method comprising, for each of a plurality of transmission cycles in a transmission period:

receiving data at a data interface of the terminal;

buffering the received data at the terminal;

enabling transmission of radio signals comprising the received data on expiry of a respective repetition interval for the cycle, the repetition interval being an interval from the start of a previous transmission, wherein the repetition intervals are controlled to reduce a proportion of the transmission period for which transmission may occur at an allowed pulse repetition interval of the radar;

checking for the presence of radar pulses during a respective wait period for each cycle whilst the terminal is not transmitting radio signals comprising received data packets; and if radar pulses are present, inhibiting the transmission of radio signals which may interfere with the radar pulses.

Further features and advantages of the invention will be apparent from the following description of preferred embodiments of the invention, which are given by way of example only.

DETAILED DESCRIPTION OF THE DRAWINGS

By way of example, embodiments of the invention will now be described in the context of a broadband point-to-point radio communications system operating in accordance with an IEEE 802.11a, b, g or n standard. However, it will be understood that this is by way of example only and that other embodiments may involve other wireless systems, and in particular point-to-multipoint systems.

Figure 1:
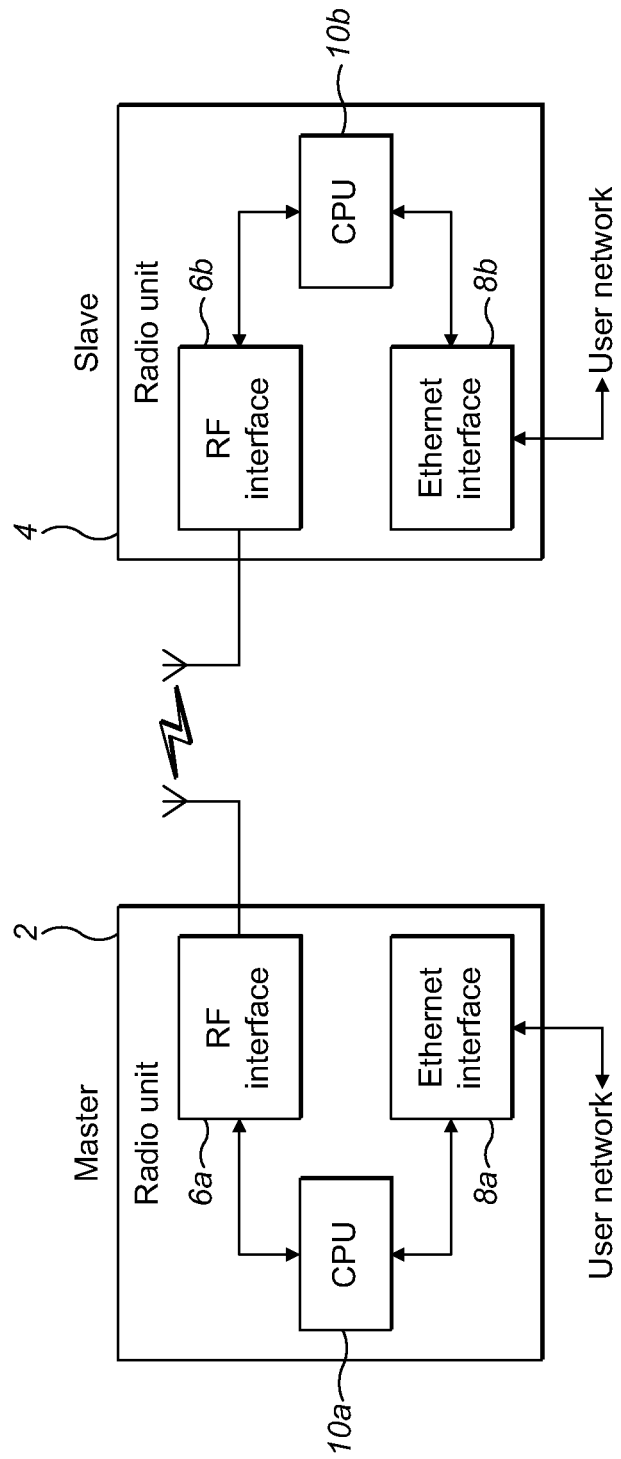
FIG. 1 is a block diagram showing a radio communication system according to an embodiment of the invention.

FIG. 1 illustrates a radio communication system comprising two radio terminals 2, 4 according to an embodiment of the invention arranged as an Internet Protocol (IP) broadband radio communication system. The system may operate, for example, within a band at approximately 5.4 GHz in a territory in which Dynamic Frequency Selection (DFS) is required. For example, the system may be deployed outdoors, and typically high gain antennas may be used, which may have a gain relative to isotropic radiation of, for example, 23 dBi, so that signals may be transmitted at sufficiently high isotropic power that the terminal is required to implement DFS and detect a specified range of radar pulse types, for example radar pulses being transmitted with one or more pulse repetition intervals selected from a set of allowed pulse repetition intervals.

As shown in FIG. 1, a signal waveform may be received at the terminal, for example the master terminal 2. The signal waveform may be checked for the presence of radar pulses, in order to determine whether to inhibit transmission as part of the requirement for DFS. The signal may be detected at the RF interface 6a, 6b, 6, the RF interface being shown in more detail in FIG. 2. The RF interface may act as a transmitter of signals of the broadband communication system and also as a receiver of signals of the broadband communication system and as a receiver of radar pulses when they are present in the operating band of the broadband communication system. A received signal waveform may comprise the signals of the broadband communication system and potentially also radar pulses, interference and noise.

Figure 2:
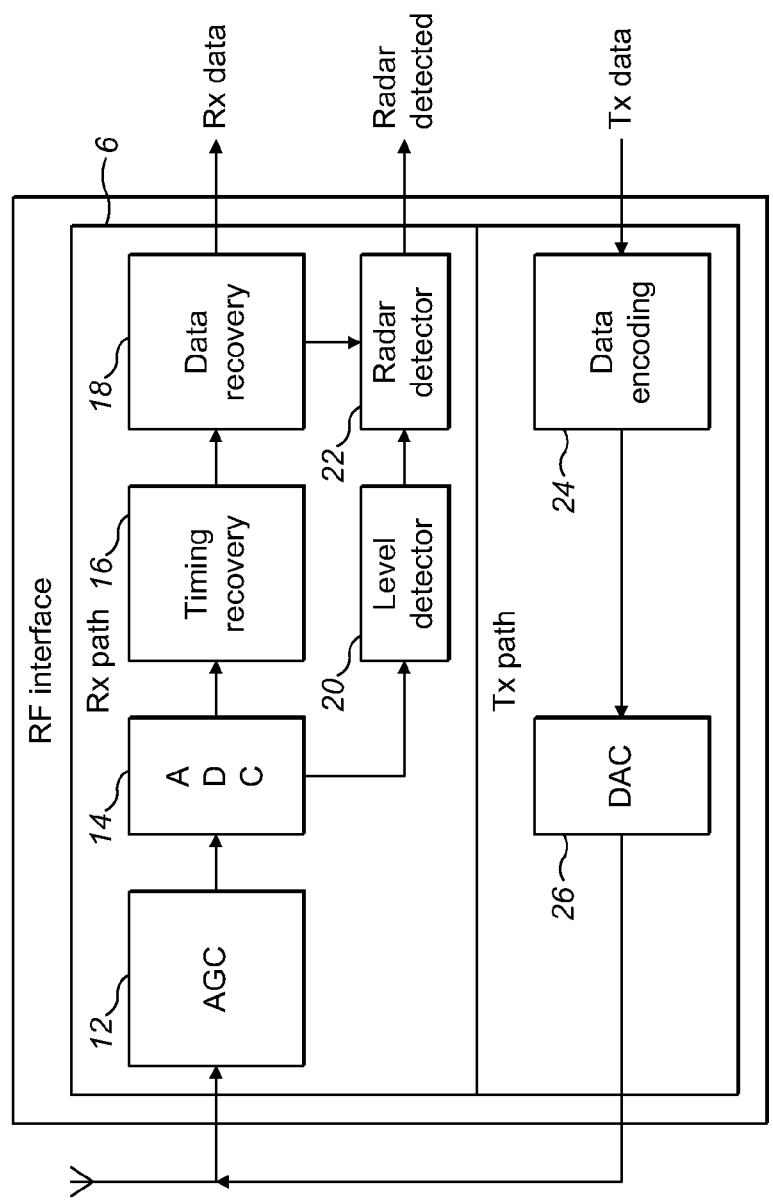
FIG. 2 is a block diagram showing an RF interface of a terminal in an embodiment of the invention.

The received waveform may pass through an Automatic Gain Control (AGC) stage 12, and an Analogue to Digital Converter (ADC) 14 before being passed to the level detector 20, and then the radar detector 22, as shown in FIG. 2. As shown in FIG. 1, the RF interface and a data receiver and data transmitter such as an Ethernet interface may be connected to a Central Processing Unit (CPU), which may comprise a processor, which may be referred to or comprise a controller.

Typically at the radar detector 22, potential radar pulses may be detected in the received signal waveform, for example by comparing a power of the received waveform with a threshold and detecting a potential radar pulse in dependence on the power of the received waveform being above the threshold. Also at the radar detector 22, a duration of a detected pulse may be determined and the detected pulse may be identified as a potential radar pulse on a basis of the duration of the detected pulse. A detected pulse having a duration that does not correspond to an allowable duration for a radar pulse may be rejected as a potential radar pulse. The detection may have been based on noise or interference rather than a radar pulse.

As may be seen in FIG. 2, the radar detector 22 may have a link to the data recovery section 18, in which wanted signals are received. A pulse may be detected as a potential radar pulse on a basis of the determination as to whether each detected pulse may be received as a wanted signal of the wireless communication system; if the pulse is a wanted signal, then it may be rejected as a potential radar pulse. This may be determined by receiving a training sequence of a wanted signal. Typically, a training sequence is received at the beginning of a radio transmission and confirmation that it is valid may be available to a radar pulse detection circuit. For example, a determination as to whether each detected pulse may be received as a wanted signal of the wireless communication system comprises receiving a cyclic prefix of an Orthogonal Frequency Division Multiplexing (OFDM) signal. This is a convenient way of determining that a signal is a wanted signal and therefore not a radar pulse in a broadband radio communications system using OFDM.

The terminals shown in FIG. 1 are typically arranged to transmit and receive in the same frequency channel, and may for example operate according to a contention-based medium access control system. Alternatively, the radio communication system may operate according to a frame-based medium access control system. Typically, it may not be possible not possible to detect radar pulse during transmission, and/or during reception of signals of the communication system, in the frequency channel in use. The timing of the transmission of data packets is typically determined at least in part by the time of arrival, at a data interface, of the data packets to be transmitted. In a frame-based system, the timing may be determined by the timing of transmit/receive frames. Therefore, it may be possible for data packets to arrive at the data interface spaced apart in time by intervals such that, when transmitted, the transmission has a pulse repetition interval corresponding to an allowed pulse repetition interval of a radar system that the terminal is required to detect so that the probability of detection of radar pulses may be reduced, according to the arrangement of data packets arriving at the data interface.

In an embodiment of the invention, data, which may be in the form of data packets such as Ethernet packets, is received at a data interface of the terminal, for example the Ethernet interface shown in FIG. 1. The received data, such as data packets, is buffered at the terminal, and transmission of radio signals comprising the received data packets is enabled on expiry of a repetition interval. This allows checking for the presence of radar pulses during a wait period whilst the terminal is not transmitting radio signals comprising received data packets.

Figure 4:
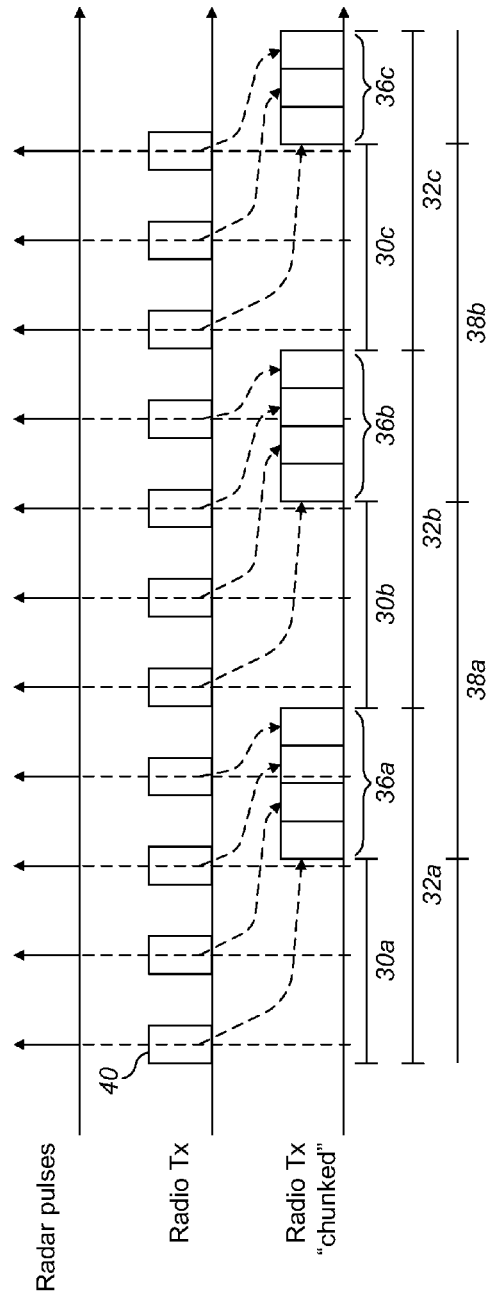
FIG. 4 is a schematic diagram illustrating buffering and transmission on expiry of repetition intervals according to an embodiment of the invention.

As shown in FIG. 4, in an embodiment of the invention, during a transmission period, there may be several transmission cycles 32a, 32b, 32c, each transmission cycle typically comprising a transmission burst 36a, 36b and 36c and each transmission cycle may have a wait period 30a, 30b, 30c. For each transmission cycle in the transmission period, transmission of radio signals is enabled, the radio signals comprising data received during the transmission cycle, and the transmission being enabled on expiry of a repetition interval 38a, 38b for the cycle. The repetition interval is an interval from the start of a transmission in the previous cycle. The repetition intervals are controlled to reduce a proportion of the transmission period for which transmission may occur at an allowed pulse repetition interval of the radar. For example, for a first part of the transmission period, repetition intervals may be arranged to have a first duration, and in a second part of the transmission period, repetition intervals may be arranged to have a second duration, different from the first duration by an amount that is arranged so that radar pulses having an allowable period may not be masked by transmissions in both the first and second parts of the transmission period. As a result, during the transmission period, it should be possible to detect radar pulses in at least some part of the transmission period. Alternatively, the durations of the repetition intervals may be arranged to have dither, for example by controlling repetition intervals according to a pseudo-random process. In this way, masking of radar pulses may also be avoided, so that it should be possible to detect radar pulses in at least some part of the transmission period since the periodicity of transmission bursts has been disrupted. Checking for the presence of radar pulses is carried out in each wait period, while the terminal is not transmitting radio signals comprising received data.

So, data may be transmitted with a transmission burst pattern such that the probability of detecting radar pulses is improved, by arranging the repetition intervals to be of a suitable length and repetition rate to detect radars transmitted with an expected range of pulse repetition intervals.

If radar pulses are detected, the transmission of radio signals which may interfere with the radar pulses may then be inhibited, for example by preventing transmission on the presently occupied channel, and if an alternative channel is available, transmitting on another channel according to a DFS procedure. The transmission of radio signals may be inhibited for a defined period to allow a confirmation of detection of radar pulses. The check for the presence of radar pulses may be used as a provisional indication of the presence of radar pulses, which may be confirmed during inhibition of transmission for the defined period in order to reduce the probability of a false alarm in the detection.

The repetition intervals may be controlled to reduce a probability of transmission at an allowed pulse repetition interval of the radar, for example, the repetition intervals may be controlled to improve a probability of detection for an expected pulse repetition interval, or an expected range of pulse repetition intervals of the radar in a territory in which it is expected to deploy the terminal.

First and second transmission patterns may be defined, the first transmission pattern being for enabling transmission of the received data periodically on expiry of each of a plurality of first repetition intervals and the second transmission pattern being for enabling transmission of the received data periodically on expiry of each of a plurality of second repetition intervals. The first and second transmission patterns may be used alternately, so that first and second repetition intervals, are used in alternating periods, so that a probability of detecting a radar having a pulse repetition interval that corresponds to the period of a transmit cycle having the first or second repetition intervals is increased. For example, the second repetition interval may be set between 10% and 40% longer than the first repetition interval, so that a probability of detecting a radar having a pulse repetition interval that corresponds to that corresponds to the period of a transmit cycle having the first repetition interval is increased during activation of the second pattern, and that a probability of detecting a radar having a pulse repetition interval that corresponds to the period of a transmit cycle having the second repetition interval is increased during activation of the first pattern. A wait period may be at the beginning of a transmission cycle, followed by a transmission period, the duration of which may depend on the amount of data to be transmitted. Data transmission may therefore cease before the end of the transmit cycle, if the transmission cycle is of a predetermined duration, and the next transmission cycle may begin at the end of the present transmission cycle. Alternatively, the next transmission cycle may start at the end of the data transmission, there being a wait period at the beginning of each transmission cycle. In this case, the duration of the transmission cycle depends on the amount of data to be transmitted.

First and second repetition intervals may be selected to be within a range of allowed pulse repetition intervals of the radar pulses, so that the first and second repetition intervals may be kept sufficiently short to reduce latency in transmission of the data packets by avoiding setting the repetition intervals to be longer than the longest allowed pulse repetition interval of the radar pulses.

The first and second transmission patterns may each be activated for a respective activation period, which may be arranged to be activated alternately, so that a probability of detecting a radar having a pulse repetition interval that corresponds to the first or second repetition intervals is increased. Typically, the activation periods are each in the range 20 milliseconds to 200 milliseconds, but periods outside this range may be advantageously used in variants of the invention. For example, more alternation of first and second repetition periods may be advantageous in introducing dither to increase minimum probability of detection of radar pulses.

In an embodiment of the invention, the wait interval may be set to be longer than a given allowed radar pulse repetition interval, so that detection of radar pulses with a high probability of detection at a given allowed radar pulse repetition interval at which a higher probability of detection is desired.

Typically, the radar pulse repetition intervals are within a range of 100 microseconds to 10 milliseconds, which encompasses the range of radar pulse repetition intervals typically specified for DFS.

In an embodiment of the invention, the repetition interval may be in the range 1 millisecond to 5 milliseconds, which has been found to be an advantageous range for increasing a probability of detection of radar pulses having pulse repetition intervals typically specified for DFS. In a particularly advantageous embodiment, the first repetition interval is in the range 1-1.3 ms, the second repetition interval is in the range 1.4-1.8 milliseconds, and the first and second activation periods are in the range 80-130 milliseconds.

In an embodiment of the invention, controlling the repetition intervals comprises applying dither to the duration of the repetition intervals, that is to say varying repetition intervals between transmission cycles, for example in an irregular or non-cyclic manner, so that a proportion of the transmission period for which transmission may occur at an allowed pulse repetition interval of the radar is reduced. Controlling the repetition intervals may comprise controlling the duration of repetition intervals according to a pseudo-random or random process.

In an embodiment of the invention, the method comprises disabling the wait period in dependence on data loading at the data interface. In this way, the latency of transmitted data may be reduced, by the disabling of the wait period, when data loading is light. In such conditions, the duty cycle of transmission from the terminal would be expected to be low, so that interference between transmission from the terminal and radar pulses may be expected to have a low probability.

The broadband radio communication system may operate according to a contention-based medium access control system, and the data received at the terminal comprises data packets, or in alternative embodiments, the broadband radio communication system may operate according to a frame-based medium access control system. In a frame-based system, such as a system using regular alternating transmit and receive periods according to a time division duplex system, the frame spacing may be adjusted dynamically, from frame to frame, in an embodiment of the invention, to avoid masking of radar pulses by transmit periods. The frame spacing can be adjusted by adjusting an idle gap between transmit and receive frames between transmission cycles, i.e. frame to frame. For example, an idle gap may be adjusted every 100 ms or so. The adjustment may be implemented by adding a variable duration further gap or "pad". This may be achieved, for example, by a transmit frame indicating the presence and/or duration of a pad, or terminals may implement the pad according to a pre-determined sequence, which may include a random or pseudo-random element. It may be advantageous for terminals in the network to be synchronised in terms of the transmit/receive sequence, so terminals in a cluster may be synchronised in terms of the adjustment of frame spacing. This may improve frequency re-use. For example, a sequence may be synchronised over a transmission period, for example one second, by means of a GPS timing signal, and for example the final pad in a sequence may be selected to maintain the transmission period at a predetermined length.

Embodiments of the invention will now be described in more detail.

Returning to FIG. 1, this shows an internet protocol (IP) broadband radio communication system, where the radio may be used to bridge between two user network nodes, so as to seamlessly join the two networks. The figure shows two radio units, that is to say terminals, which may be identical, but one is deemed to be the Master unit 2. The Master unit 2 typically takes the lead in link establishment, performing channel selection operations, for example, and the Slave unit 4 connects to the Master. The Central Processing Unit (CPU) block 10*a*, 10*b* shown in FIG. 1 controls the operation of the terminal including the radio and is used to route packets to and from the Ethernet interface and radio frequency (RF) interface. A computer program to control the terminal to perform the method of the invention may run on the CPU. The computer program may be carried as instructions on a non-transitory computer readable medium, causing a processor to cause a terminal to perform a method according to the claimed invention. The Ethernet Interface 8*a*, 8*b* is typically the IEEE802.3 interface used to connect to the user network. The RF interface block 6*a*, 6*b*, 6 is typically an IEEE802.11 interface providing encoding and decoding of user data for transfer over the air interface.

FIG. 2 is a simplified block diagram of the RF interface block. As shown in FIG. 2, the AGC block 12 provides Automatic Gain Control for the radio front end, to provide sufficient dynamic range for the subsequent signal recovery steps. The ADC block 14 is an Analogue to Digital Converter. The Timing Recovery block 16 provides synchronisation to the encoded data, and the Data Recovery block 18 provides recovery of the user data from the radio signals, using for example Fast Fourier Transform (FFT) and Forward Error Correction (FEC) Techniques. The Level Detector block 20 evaluates the RF energy present and indicates to the Radar Detector block 22 if it exceeds the radar detection threshold. The Radar Detector block 22 evaluates the RF level from the detector block to check if the energy could be from a radar pulse, and it also takes input from the Data Recovery block 18. Since the energy in a received (Rx) signal often exceeds the radar threshold, the presence of valid received data may establish that a raised level is not a radar pulse. So, if the transmitter is active or if valid received data is present, the Radar Detected signal may not be asserted in response to the Level Detector 20.

Referring again to FIG. 2, the radio transmit (Tx) path incorporates at least a Data Encoding block 24, which is essentially the inverse of the Data Recovery block 18, using for example FEC encoding techniques, and a DAC block 26 which is a Digital to Analogue Converter.

As can be seen from FIG. 1, a packet received at the Ethernet interface 8*a* on the Master radio unit 2 may be processed by the CPU 10*a* and supplied to the RF interface 6*a* for transmission to the Slave radio unit, that is to say Slave terminal 4. The Slave radio unit receives the data on the RF interface and subsequently transmits it on the Ethernet Interface. With this operation, it is apparent that the RF activity is directly related to the Ethernet interface activity, hence the operation of the radio is subject to the user environment.

When the radio is intended for operation in a region or territory requiring Dynamic Frequency Selection, for example operating according to ETSI EN 301 893 V1.5.1, ETSI EN 302 502 V1.2.1 or FCC 06-96, a high probability of radar pulse detection is required. A radar pulse train may consist of, for example, between 9 and 45 pulses with a pulse interval, for example, from 150 us to 5 ms.

As mentioned in the Radar Detector block description above, the radio may not be able to detect radar pulses during transmit and/or receive activity. This inability, or reduced ability, to detect to radar pulses during radio activity may cause difficulty with achieving the required detection probability given the uncertainty of the type of user data that may be encountered.

Figure 3:
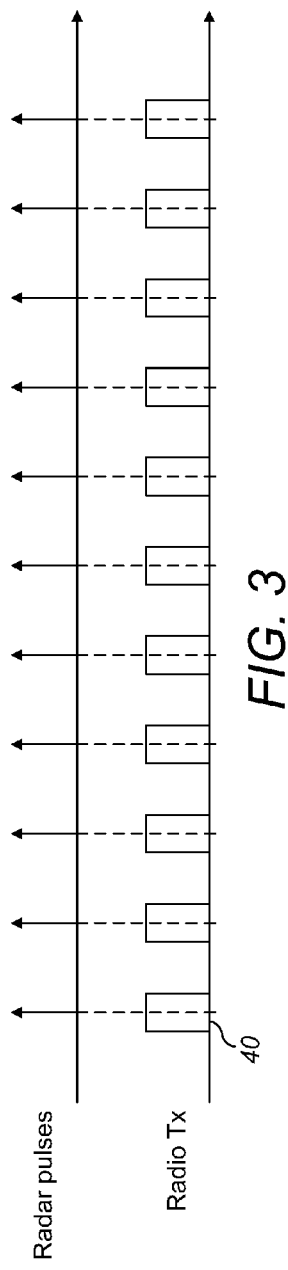
FIG. 3 is a schematic diagram showing a sequence of radar pulses illustrating blocking of detection by radio transmissions.

For example, an RF transmission every 150 us could potentially block a radar pattern with a 150 us, 300 us, 450 us etc. pulse interval between transmission periods 40 as shown in FIG. 3.

There is typically a wide range of radar parameters for radar pulses that require detection and a high probability of detection is typically required. In embodiments of the invention radio transmissions may be constrained in time, so as to maximise the detection probability. In an embodiment of the invention, the data is arranged into bursts 36*a*, 36*b*, 36*c*, which may also be referred to as chunks, for RF transmission, to impose a regular structure to the transmission times, repeated at a repetition interval, so as to be able to avoid any transmission intervals that would beat with the radar patterns for the whole of a transmission period. That is, received Ethernet interface packets are buffered for a given time and then transmitted as a burst, typically a continuous burst. As can be seen from FIG. 4, the radar pulses in wait periods 30a, 30b, 30c between bursts are not blocked by transmissions and so are detectable. Accordingly, the probability of detection of a sufficient number of pulses to enable detection of a radar pulse stream is increased.

Figure 5:
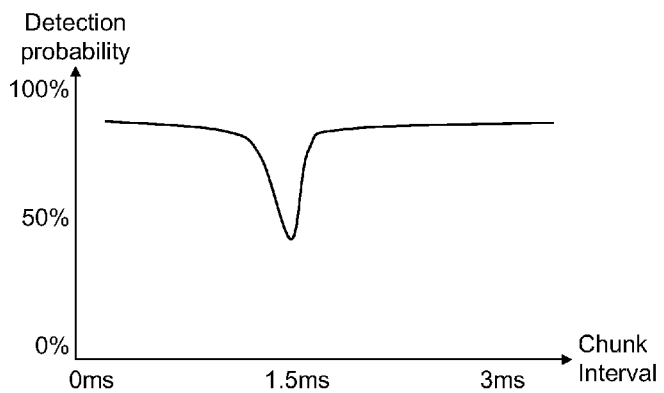
FIG. 5 is a schematic diagram illustrating detection probability as a function of repetition interval, also referred to as chunk interval.

The use of a single repetition interval between bursts may not benefit the detection of a pulse sequence which has the same interval as the repetition interval, also known as the chunk interval, since the periodicity of the two events would beat. It can be demonstrated that the detection probability may be affected by the chunk interval as shown in FIG. 5. To improve detection in this instance, the chunk interval can be modulated. For instance, the chunk interval can be changed between 2 or more values at intervals, so as to mitigate against regions of low detection probability for some values of detection interval.

Figure 6:
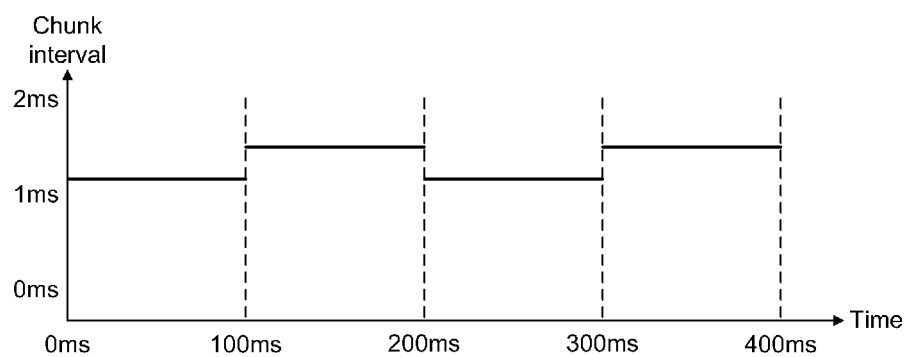
FIG. 6 is a schematic diagram illustrating alternation of activation periods for first and second repetition intervals.

FIG. 6 shows an example of an embodiment of the invention in which the chunk interval, that is to say repetition interval, is changed between 1.2 ms and 1.5 ms every 100 ms. The detection probability for a 1.2 ms Pulse Repetition Interval (PRI) radar type in the 1.2 ms period would be approximately 50%, whereas it will be approximately 90% in the 1.5 ms interval, and vice-versa for a 1.5 ms radar PRI. Given this, the cumulative probability for both radar types is approximately 70% ((50%+90%)/2). The change of repetition intervals between activation periods can be chosen to match the radar detection needs.

Figure 7:
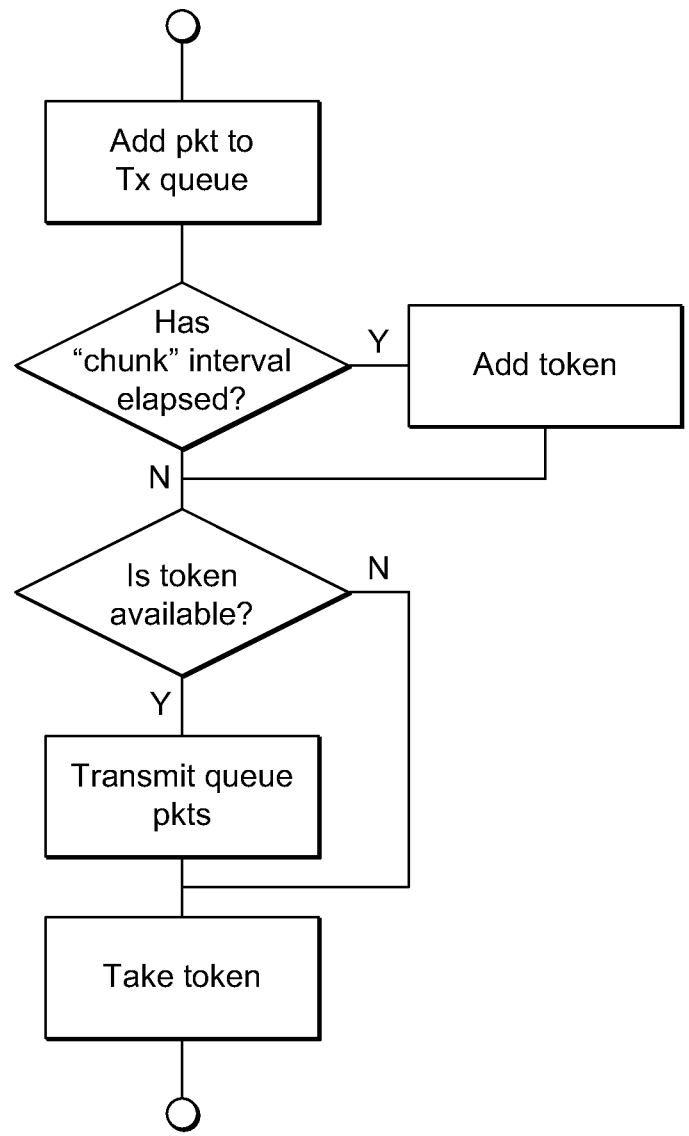
FIG. 7 is a flow diagram showing implementation of buffering and transmission on expiry of repetition intervals according to an embodiment of the invention.

In embodiments of the invention, a token mechanism may be used to implement the chunking interval, as illustrated in FIG. 7. A token can be viewed as the right to transmit on the RF interface, and the transmitter is only permitted to hold one token at any given time. When a data packet is received on the Ethernet interface, that is to say the data interface, it is added to a transmit queue and a decision is then made as to whether the transmit queue is allowed to be serviced for transmission. If the chunk interval has elapsed since the last time a token was added, then a token is added and the time recorded. If a token is available then the transmitter is permitted to service the transmit queue and the token is removed as shown in FIG. 7. The chunk interval, that is to say repetition interval, may be changed between a first repetition interval and a second repetition interval, for example between 900 us and 1100 us, every 100 ms for example.

In an embodiment of the invention, disabling of transmission until expiry of a wait period may be selected or not selected according to data loading conditions. The wait period may be disabled in dependence on data loading at the data interface. For example, the wait period may be disabled by setting the wait period to zero. The wait period may be enabled when the probability of detection of radar pulses is determined to be likely to be downgraded by transmissions from the terminal. In this way, latency may not be compromised during light loading.

In an embodiment of the invention, the chunk interval, that is to say repetition interval, can be adjusted to best match the radar type. If the chunk interval is relatively short, then the effect is to introduce dither to the radio transmissions. Depending on the radar detection required, this can improve the probability of detection with small impact on the latency.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of transmitting data packets from a terminal of a broadband radio communication system, the terminal being capable of transmitting radio signals which may interfere with radar pulses, the radar pulses being transmitted with one or more pulse repetition intervals, the method comprising, for each of a plurality of transmission cycles in a transmission period:
receiving data at a data interface of the terminal;
buffering the received data at the terminal;
enabling transmission of radio signals comprising the received data on expiry of a respective transmission repetition interval for the cycle, the transmission repetition interval being an interval from the start of a previous transmission, wherein the transmission repetition intervals are controlled to reduce a proportion of the transmission period for which transmission may occur at an allowed pulse repetition interval of the radar pulses;
checking for the presence of radar pulses during a respective wait period for each cycle whilst the terminal is not transmitting radio signals comprising received data packets; and
if radar pulses are present, inhibiting the transmission of radio signals which may interfere with the radar pulses.

2. The method according to claim 1, wherein said inhibiting of the transmission of radio signals inhibits the transmission for a defined period to allow a confirmation of detection of radar pulses.

3. The method according to claim 1, the method comprising:
controlling the transmission repetition intervals to reduce a probability of transmission at an allowed pulse repetition interval of the radar pulses.

4. The method according to claim 1, wherein the controlling of the transmission repetition intervals comprises:
defining first and second transmission patterns, the first transmission pattern being for enabling transmission of the received data periodically on expiry of each of a plurality of first transmission repetition intervals and the second transmission pattern being for enabling transmission of the received data periodically on expiry of each of a plurality of second transmission repetition intervals.

5. The method according to claim 4, wherein each of the plurality of second transmission repetition intervals is between 10% and 40% longer than each of the plurality of first transmission repetition intervals.

6. The A method according to claim 5, wherein the first and second transmission repetition intervals are selected to be within a range of allowed pulse repetition intervals of the radar pulses.

7. The method according to claim 4, wherein the first and second transmission patterns are each activated for a respective first and second activation period.

8. The method according to claim 7, wherein the first and second activation period are arranged to be activated alternately.

9. The method according to claim 8, wherein the activation periods are each in the range 20 milliseconds to 200 milliseconds.

10. The method according to claim 1, wherein the controlling of the transmission repetition interval comprises:
setting each transmission repetition interval to be longer than a given allowed radar pulse repetition interval.

11. The method according to claim 1, wherein the radar pulse repetition intervals are within a range of 100 microseconds to 10 milliseconds.

12. The method according to claim 1, wherein the transmission repetition intervals are in the range 1 millisecond to 5 milliseconds.

13. The method according to claim 7, wherein the first transmission repetition interval is in the range 1-1.3 ms, the second transmission repetition interval is in the range 1.4-1.8 milliseconds, and the first and second activation periods are in the range 80-130 milliseconds.

14. The method according to claim 1, wherein controlling the transmission repetition intervals comprises applying dither to the duration of the transmission repetition intervals.

15. The method according to claim 1, wherein controlling the transmission repetition intervals comprises controlling the duration of transmission repetition intervals according to a pseudo-random process.

16. The method according to claim 1, the method comprising disabling the wait period in dependence on data loading at the data interface.

17. The method according to claim 1, wherein the broadband radio communication system operates according to a contention-based medium access control system, and the data received at the terminal comprises data packets.

18. The method according to claim 1, wherein the broadband radio communication system operates according to a frame-based medium access control system.

19. A terminal for transmitting data packets in a broadband radio communication system, the terminal being capable of transmitting radio signals which may interfere with radar pulses, the radar pulses being transmitted with one or more pulse repetition intervals, the terminal comprising:
a data receiver arranged to, for each of a plurality of transmission cycles, receive data at a data interface of the terminal;
a buffer arranged to, for each of the plurality of transmission cycles, buffer the received data at the terminal; and
a controller arranged to:
enable transmission of radio signals comprising the received data on expiry of a respective transmission repetition interval for the cycle, the transmission repetition interval being an interval from the start of a previous transmission, wherein the transmission repetition intervals are controlled to reduce a proportion of the transmission period for which transmission may occur at an allowed pulse repetition interval of the radar pulses;
check for the presence of radar pulses during a respective wait period for each cycle whilst the terminal is not transmitting radio signals comprising received data packets; and
if radar pulses are present, inhibit the transmission of radio signals which may interfere with the radar pulses.

20. A non-transitory computer readable medium comprising instructions to cause a processor to cause a terminal to perform a method of transmitting data packets from a terminal of a broadband radio communication system, the terminal being capable of transmitting radio signals which may interfere with radar pulses, the radar pulses being transmitted with one or more pulse repetition intervals, the method comprising for each of a plurality of transmission cycles in a transmission period:
receiving data at a data interface of the terminal;
buffering the received data at the terminal;
enabling transmission of radio signals comprising the received data on expiry of a respective transmission repetition interval for the cycle, the transmission repetition interval being an interval from the start of a previous transmission, wherein the transmission repetition intervals are controlled to reduce a proportion of the transmission period for which transmission may occur at an allowed pulse repetition interval of the radar pulses;
checking for the presence of radar pulses during a respective wait period for each cycle whilst the terminal is not transmitting radio signals comprising received data packets; and
if radar pulses are present, inhibiting the transmission of radio signals which may interfere with the radar pulses.

* * * * *